United States Patent [19]
Noel

[11] Patent Number: 5,887,825
[45] Date of Patent: Mar. 30, 1999

[54] MULTI-STAGE PARACHUTE RELEASE

[75] Inventor: Vincent R. Noel, Huntington Beach, Calif.

[73] Assignee: McDonnell Douglas Corporation, Huntington Beach, Calif.

[21] Appl. No.: 723,103

[22] Filed: Oct. 1, 1996

[51] Int. Cl.⁶ ................................................. B64D 17/38
[52] U.S. Cl. ...................... 244/147; 244/151 B; 244/152
[58] Field of Search ................ 244/138 R, 147, 244/149, 150, 151 A, 151 B, 152

[56] References Cited

U.S. PATENT DOCUMENTS

| | | |
|---|---|---|
| 2,502,470 | 4/1950 | Martin ...................................... 244/147 |
| 3,713,387 | 1/1973 | Karp . |
| 3,730,099 | 5/1973 | Schoop . |
| 3,872,556 | 3/1975 | Frost . |
| 3,926,391 | 12/1975 | Nordine .................................. 244/149 |
| 3,992,999 | 11/1976 | Chevrier et al. ........................ 244/149 |
| 4,637,577 | 1/1987 | Miseyko et al. ........................ 244/149 |
| 4,721,272 | 1/1988 | Nordhaus .......................... 244/122 AF |
| 4,953,813 | 9/1990 | Postler et al. . |
| 5,386,781 | 2/1995 | Day . |

*Primary Examiner*—Galen L. Barefoot
*Attorney, Agent, or Firm*—Harness Dickey & Pierce P.L.C.

[57] ABSTRACT

A parachute release mechanism is provided which is compact, lightweight, and free from external wire harnesses. The release mechanism includes a passage connected between a source of pressurized gas and a piston chamber having a piston disposed therein. A shear pin is disposed in an opening in the piston and in the piston chamber. Activation of the source of pressurized gas causes the piston to move forward shearing the shear pin and either deploying or releasing a parachute.

14 Claims, 2 Drawing Sheets

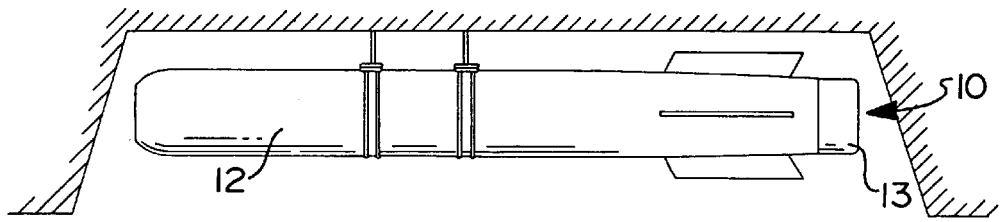
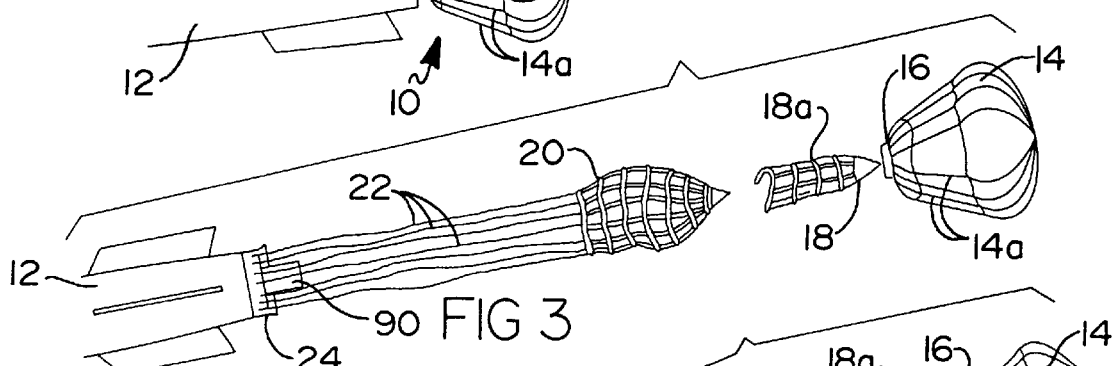
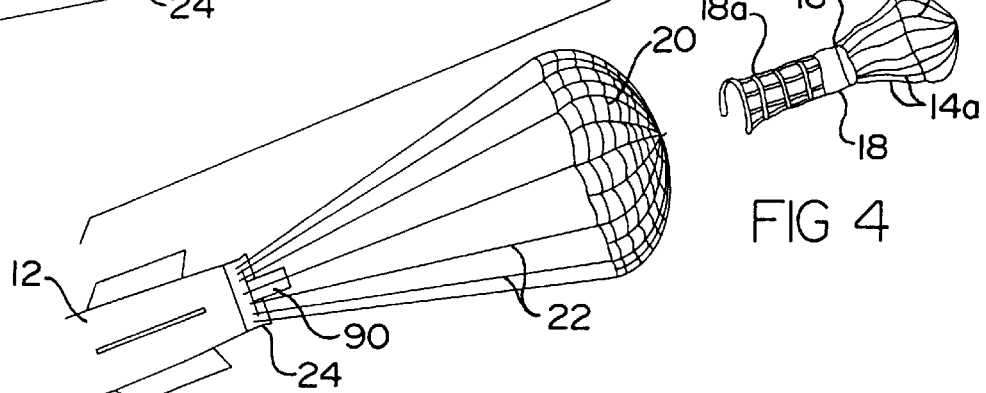
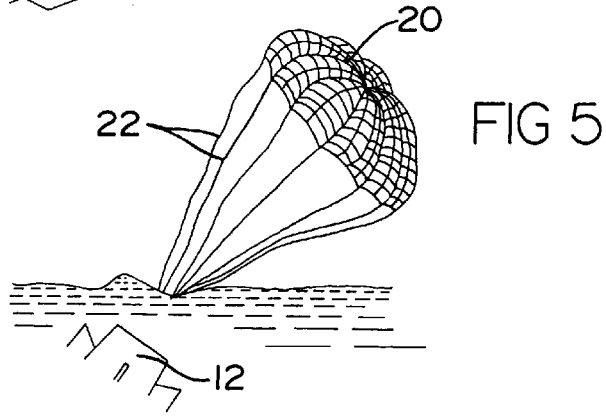

MULTI-STAGE PARACHUTE RELEASE

BACKGROUND OF THE INVENTION

Field of the Invention

The present invention relates to a parachute release mechanism, and more particularly, to a multi-stage parachute release mechanism.

BACKGROUND AND SUMMARY OF THE INVENTION

Parachutes are used in many applications including the deployment of cargo to remote locations by air drop. In addition, when a weapon, such as a torpedo, is launched from an aircraft at high speeds, random forces will cause early pitch acceleration and random torpedo flight attitudes. To counteract these erratic movements, early torpedo stabilization is needed. Similarly, when an intermediate water depth mine is launched from an aircraft at high speeds, the impact of the water depth mine with the water surface can destroy the mine. Thus, stabilization and deceleration of the mine is also needed. Many parachute systems include a first parachute which is deployed to provide early stabilization and a second main parachute which is deployed in order to further stabilize or decelerate the object being dropped. The deployment of the first parachute and the main parachute without the use of an external electrical wire harness is desirable when used with underwater torpedoes or mines.

Accordingly, the present invention provides a parachute release mechanism comprising: a gas cartridge; a passage connected between said gas cartridge and a piston chamber having a piston member disposed therein; a shear pin disposed in an opening in said piston member and in an opening in said piston chamber; wherein activation of said gas cartridge applies a pressure against said piston which causes said shear pin to be sheared and said shear pin to be released which thereby deploys a parachute. The present invention also employs a load carrying segment disposed adjacent to a piston for securing a fitting member in place. The movement of the piston allows the load carrying segment to disengage the fitting member which is thereby released.

The release mechanism of the present invention may also find utility in other areas where a light weight compact release mechanism is desired. Accordingly, a release mechanism is provided, comprising: a source of pressurized gas; a passage connected between said source and a piston chamber having a piston member disposed therein; at least one load carrying segment held in place by said piston member; said at least one load-carrying segment having load carrying portions for securing a first member to a second member; wherein activation of said source of pressurized gas applies a pressure against said piston which causes said piston to be moved away from said at least one load carrying segment, thereby allowing said load carrying segment to disengage said first and second members.

Further areas of applicability of the present invention will become apparent from the detailed description provided hereinafter. It should be understood, however, that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein:

FIGS. 1–5 illustrate side views of an intermediate water depth mine in various stages of deployment of a parachute system subsequent to drop from the bombay of an aircraft.

DETAILED DESCRIPTION OF THE PREFERRED EMBODIMENTS

Figure 6:
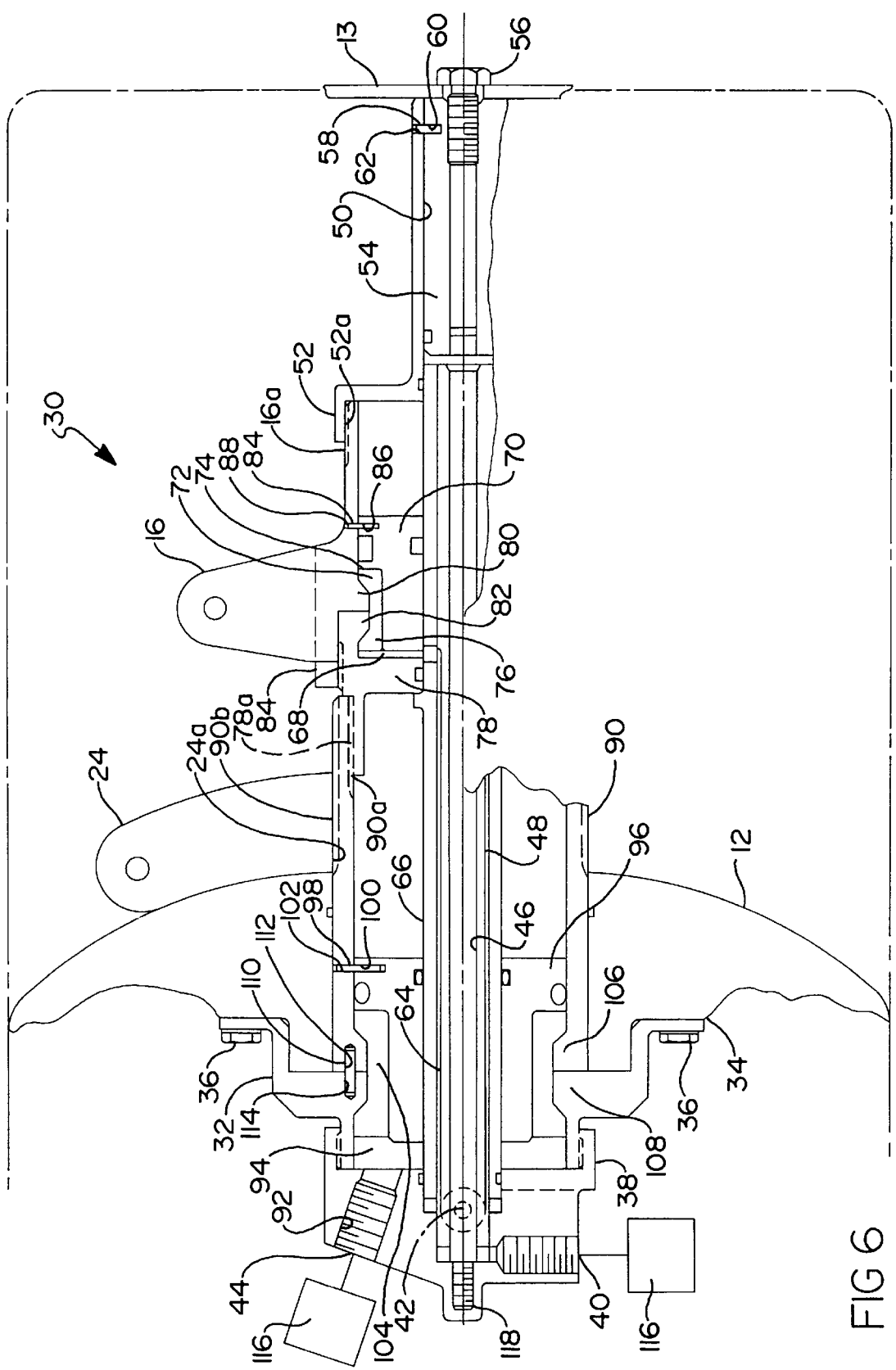
FIG. 6 is a cross-sectional view of the multi-stage parachute release mechanism according to the present invention.

With reference to FIGS. 1–6, the present invention will be described. FIGS. 1–5 illustrate the various stages of deployment of a parachute system 10 subsequent to drop of an intermediate water depth mine 12 according to the principles of the present invention. The parachute system 10 includes a small stabilizer parachute 14 which is shown deployed in FIG. 2. As shown in FIG. 2, the lines 14a of the stabilizer parachute are connected to an attachment fitting 16 which is also connected to deployment lines 18 attached to main parachute 20. The main parachute 20 is shown deployed in FIG. 3, and located aft thereof are deployment lines 18. Connected to the deployment lines 18 and the stabilizer parachute 14 is the attachment fitting 16. The deployment lines 18 break free from the main parachute as shown in FIG. 4 after the attachment fitting 16 is released and main parachute 20 is deployed. Main parachute 20 is attached to main parachute attachment fitting 24 by lines 22. Main parachute 20 and attachment fitting 24 are released from intermediate water depth mine 12 at approximately the time the mine 12 enters the water, as shown in FIG. 5.

With reference to FIG. 6, the release mechanism of the present invention will be described. As mentioned above, the release mechanism 30 of the parachute system 10 is attached to the aft end of a vehicle 12 such as an intermediate water depth mine or a torpedo. Release mechanism 30 includes an adapter plate 32 mounted on the interior 34 of vehicle 12 by a plurality of bolts 36. A manifold 38 is attached to adapter plate 32. Manifold 38 includes first, second, and third gas cartridge ports 40, 42, 44, respectively. First gas cartridge port 40 communicates with a passage 46 provided in an inner-manifold tube 48. Passage 46 is connected to a first piston chamber 50 disposed in a deployment piston housing 52. A first piston 54 is disposed in first piston chamber 50. Canister cover 13 is attached to first piston 54 by a bolt 56. A shear pin 58 is disposed in a bore 60 in first piston 54 and also in hole 62 disposed in deployment piston housing 52. Deployment piston housing 52 is provided with internal threads 52a which engage external threads 16a of attachment fitting 16.

Second gas cartridge port 42 communicates with passage 64 defined by the grooved outer diameter of inner-manifold tube 48 and an inner surface of outer manifold tube 66. Passage 64 communicates with first release piston chamber 68 defined by attachment fitting 16. A first release piston 70 is disposed in first release piston chamber 68. A plurality of load carrying segments 72 are provided with load carrying portions 74, 76 which secure attachment fitting 16 to a load link member 78. Attachment fitting 16 is provided with a radially inward projecting portion 80 which engages load carrying portion 74, while load link 78 is provided with a radially inward projecting portion 82 which is engaged by load carrying portion 76 of segments of 72. A jam nut 84 is threadedly attached to load link 78 and applies a force against attachment fitting 16 thereby applying a pre-load to load carrying segments 72. Release piston 70 is provided adjacent to load carrying segments 72 for supporting segments 72 in a radially inward direction. A shear pin 84 is provided in a bore 86 in first release piston 70 and also in a hole 88 disposed in attachment fitting 16.

Load link member 78 is provided with an externally threaded portion 78a which is threadedly attached to internally threaded portion 90a of a main parachute support column 90. Main parachute attachment fitting 24 is provided with an internally threaded portion 24a which is threadedly attached to an externally threaded portion 90b of main parachute support column 90. Gas cartridge port 44 is connected to a passage 92 which communicates with a second release piston chamber 94. A second release piston 96 is disposed in second release piston chamber 94. A shear pin 98 is disposed in a bore 100 in second release piston 96 and in a hole 102 in main parachute support column 90. A plurality of load carrying segments 104 are disposed between second release piston 96 and a radially inward extending portion 106 of main parachute support column 90 and a radially inward extending portion 108 of adapter plate 30. A torque resisting pin 110 is shown received in an end portion 112 of support column 90 and a corresponding bore 114 in adapter plate 32.

A plurality of gas cartridges 116 are attached to first, second, and third gas cartridge ports 40, 42, 44. In operation, gas cartridge 116 attached to first gas cartridge port 40 is activated to deploy stabilizer parachute 14 by the action of hot gases emanating from the cartridge 116 installed into port 40. The gases flow up the center of passage 46 in tube 48 and build up behind piston 54 until enough pressure is obtained to cause the piston 54 to shear shear pin 58 and deploy canister cover 13 to which the first stage parachute 14 is attached. The piston 54, bolt 56, and canister 13 are ejected, but everything else remains intact at this time.

The first stage parachute loads are transferred to attachment fitting 16 and to load carrying segments 72, load link 78, support column 90, adapter plate 32, and into the vehicle structure 12.

The main parachute 20 is released by hot gases emanating from an electro-explosive cartridge 116 installed in second gas cartridge port 42. The gases travel from the cartridge into the grooved outer diameter slots 64 of inner-manifold tube 48 and to release piston chamber 68 behind first release piston 70. The gas pressure builds up behind first release piston 70 forcing it to shear shear pin 84. First release piston 70 moves forward allowing load carrying segments 72 to fall toward the centerline of the device thus releasing the structural attachment of attachment fitting 16 to the main vehicle 12. The load on attachment fitting 16 produced by the first stage parachute 14 plus the internal gas pressure behind piston 70 forces the attachment fitting 16 and deployment piston housing 52 away from the vehicle 12.

The main parachute deployment lines 18 are also attached to the attachment fitting 16. The first stage parachute 14 drags out the attachment fitting 16 and along with it, the main parachute bag 18a, as shown in FIG. 3. The main parachute suspension lines 22 are supported by main parachute attachment fitting 24. Release of the main parachute 20 can be accomplished underwater or just prior to impact with the surface of the water.

The main parachute 20 is released by hot gases emanating from an electro-explosive cartridge 116 installed in third gas cartridge port 44. The gas pressure builds up in second release piston chamber 94 behind second release piston 96 causing it to shear shear pin 98 and move forward. The forward motion of second release piston 96 removes the restraint on the load carrying segments 104 and allows them to fall toward the center of the device thus releasing the structural attachment of the main parachute support column 90 to vehicle 12. The load on the main parachute 20 assists in moving the segments 104 toward the center by providing a camming action between the support column 90 and the load carrying segments 104. The load on the main parachute attachment fitting 24 produced by the dragging main parachute 20 and the gas pressure behind piston 96 forcibly eject the main parachute attachment fitting 24 and jam nut 84, load link 78, inner-manifold tube 48, outer-manifold tube 66, second release piston 96 and load carrying segments 104 leaving manifold 38 and adapter plate 23 along with the electro-explosive cartridges 116 installed in ports 40, 42, and 44 with the vehicle 12. This action releases the main parachute 20 from the vehicle and leaves only a cavity in the vehicle 12 and no external protrusions.

The release device 30 can be safely transported and handled by threading a long safety rod into the threaded hole 118 and manifold 38.

Variations of the design of the present invention can be used in any application that requires high load carrying capability with the ability of quick release. An electrical signal to the electro-explosive device is all that is required for release. In addition, the present invention can be used for the release of other parachute systems, vehicle stages, tension cables, and many other devices. A variation to the use of electro-explosive devices would be use of stored high pressure gases to initiate the release sequence.

The coaxial arrangement of pistons 54, 70, and 96 provides a compact arrangement which allows the release mechanism 30 to be produced with reduced weight and spacial constraints. The use of individual load carrying segments supported by a movable piston which releases the load carrying segments provides a unique method for releasing members which allow the electrical wire into the maintained interior of the vehicle while releasing the members from the exterior of the vehicle.

Furthermore, the porting of the gases along the centerline of the device provides an efficient use of the space and thus contributes to the compactness of the design.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A parachute deployment mechanism, comprising:

a fitting member;

a parachute coupled to said fitting member;

a gas cartridge;

a manifold member operably associated with said fitting member;

said manifold member having a passage extending between said gas cartridge and a first piston chamber, said first piston chamber having a first piston member disposed therein;

a shear pin disposed in an opening in said first piston member and in an opening in said first piston chamber;

wherein activation of said gas cartridge applies gas pressure against said piston which causes said piston to shear said shear pin and to be released, which thereby deploys said said parachute;

a second gas cartridge;

a second passage connected between said second gas cartridge and a release piston chamber having a release piston member disposed therein, said release piston chamber being operably associated with said fitting member;

a second shear pin disposed in an opening in said release piston member and in an opening in said release piston chamber;

at least one load carrying segment disposed adjacent to said release piston and securing said fitting member in place; and wherein activation of said second gas cartridge applies a pressure against said release piston which causes said second shear pin to be sheared and said release piston to be released, which allows said at least one load carrying segment to move radially inward thereby releasing said support member from said mechanism.

2. The parachute deployment mechanism according to claim 1, wherein said first passage is disposed in a tube member and extends from a vehicle interior to a vehicle exterior.

3. The parachute deployment mechanism according to claim 1, wherein said first and second passages are disposed in a tube member and extend from a vehicle interior to a vehicle exterior.

4. The parachute deployment mechanism according to claim 3, wherein said tube member includes an outer manifold and an inner manifold, one of said first and second passages being disposed in a center of said inner manifold and the other of said first and second passages being defined between said inner and outer manifolds.

5. The parachute deployment mechanism according to claim 1, further comprising a parachute canister cover attached to said first piston member.

6. The parachute deployment mechanism according to claim 1, further comprising a second parachute attached to a support member and having deployment lines attached to said fitting member.

7. The parachute deployment mechanism according to claim 6, further comprising:

a third gas cartridge;

a third passage disposed between said third gas cartridge and a second release piston chamber having a second release piston disposed therein;

a third shear pin disposed in a hole in said second release piston and said second release piston chamber; and at least one load carrying segment disposed against said second release piston and securing said support member in place;

wherein activation of said third gas cartridge applies a gas pressure against said second release piston which causes said third shear pin to be sheared and said second release piston to be ejected from said second release piston chamber, which allows said at least one load carrying segment to move radially inward within said second release piston chamber, thereby releasing said support member.

8. The parachute deployment mechanism according to claim 1, wherein said first piston member and said release piston member are disposed coaxially relative to one another.

9. A parachute deployment apparatus for use with a device to control motion of said device, said apparatus comprising:

a container adapted to hold a first parachute;

a first fitting member adapted to be secured to said first parachute;

a manifold operably secured to said device, said first fitting member being releasably secured to said manifold;

said manifold having a first passage in communication with a first piston chamber, and a second passage disposed coaxially relative to said first passage and being in communication with a second piston chamber disposed coaxially relative to said first piston chamber;

a first piston disposed within said first passage and operably associated with said container;

a second piston disposed within said second passage and operably associated with a second fitting member;

a first shear pin operably associated with said first piston chamber and said first piston for releasably securing said first piston within said first piston chamber;

a second shear pin operably associated with said second piston chamber and said second piston for releasably securing said second piston within said second piston chamber;

a first pressure creating mechanism for exerting a force on said first piston sufficient to shear said first shear pin and eject said first piston and said container associated therewith from said manifold, whereby said first parachute is deployed; and a second pressure creating mechanism independent of said first pressure creating mechanism for exerting a force on said second piston sufficient to shear said second shear pin and eject said second piston from said second piston chamber, to thereby deploy said second parachute associated therewith.

10. The apparatus of claim 9, further comprising:

a third passage associated with said manifold and disposed coaxially relative to said second passage;

a third piston chamber disposed coaxially relative to said second piston chamber;

a third piston disposed within said third piston chamber;

a third shear pin operably associated with said third piston chamber and said third piston for releasably securing said third piston within said third piston chamber;

a third fitting operably associated with said third piston and coupled to said second parachute;

a third pressure creating mechanism operably associated with said third passage for generating a pressure sufficient to shear said third shear pin, thereby releasing said second fitting and said third parachute from said manifold, and therefore from said apparatus.

11. A parachute deployment apparatus for stabilizing travel of a device attached thereto, said apparatus comprising:

a release mechanism comprising a manifold fixedly secured to said device;

said manifold having first and second coaxially disposed passages in communication with first and second coaxially disposed piston chambers, each of said piston chambers having a piston disposed therein;

a member associated with said release mechanism and adapted to be secured to a plurality of deployment lines of a parachute to secure said parachute to said device after said parachute is deployed;

a first pressure generating mechanism for causing said first piston to be ejected from said first piston chamber, thereby causing said parachute to be deployed; and a second pressure generating mechanism for causing said second piston to be ejected from said second piston chamber, whereby ejection of said second piston causes said member to be detached from said release mechanism allowing said parachute to be separated from said device.

12. The apparatus of claim 11, wherein each of said first and second pressure generating mechanisms comprise an electrically activatable gas cartridge.

13. The apparatus of claim 11, further comprising a load carrying segment operably associated with said member and disposed adjacent said second piston such that ejection of said piston enables said load carrying segment to move radially relative to said piston chamber, thereby causing said member to be detached from said release mechanism.

14. The apparatus of claim 11, further comprising a first shear pin operably associated with said first piston and a second shear pin operably associated with said second piston, each of said shear pins operating to maintain its respective piston within its associated piston chamber until each said piston is forcibly ejected therefrom.

* * * * *

UNITED STATES PATENT AND TRADEMARK OFFICE
CERTIFICATE OF CORRECTION

PATENT NO. : 5,887,825
DATED : March 30, 1999
INVENTOR(S) : Vincent R. Noel

It is certified that error appears in the above-identified patent and that said Letters Patent is hereby corrected as shown below:

Title page, after the title insert the followings:

-- This invention was made with Government support under Contract No. N00024-80-C-6302 awarded by the United States Navy. The Government has certain rights in this invention. --

Column 4, Line 17, after "rod" insert -- (not shown) --.

Column 4, Line 64, delete second occurrence of "said".

Signed and Sealed this

Nineteenth Day of October, 1999

Attest:

Q. TODD DICKINSON

Attesting Officer

Acting Commissioner of Patents and Trademarks